Dec. 4, 1962  G. F. QUITTNER  3,067,370
ELECTRIC MOTOR STARTER
Filed Oct. 18, 1960

INVENTOR.
GEORGE F. QUITTNER
BY
Richard H. MacCutcheon,
atty.

United States Patent Office 3,067,370
Patented Dec. 4, 1962

3,067,370
ELECTRIC MOTOR STARTER
George F. Quittner, 1780 Cumberland Road,
Cleveland Heights 18, Ohio
Filed Oct. 18, 1960, Ser. No. 63,325
5 Claims. (Cl. 318—137)

The present invention relates to electromechanical starters particularly useful in conjunction with electric motors of the brushless D.C. type with the necessary commutation provided by means other than moving mechanical contacts.

In my co-pending patent application Ser. No. 2,482, filed May 16, 1960, and for "Direct Current Motor," the use of multivibrator circuits for producing commutation for brushless direct current powered motors is disclosed. As described therein, it is advantageous to bias one or more multivibrators so that when the rotor is stopped the multivibrators do not oscillate, and one multivibrator is in the state where one of its active elements (such as a transistor) is conducting heavily while its other active element is essentially not conducting. If the multivibrators are adjusted in this manner, the motor may not be self-starting, and separate means must be employed to set the rotor into motion. If, contrary to the above, the bias is adjusted to produce oscillation even when the rotor is stopped, various types of shading poles and/or phase shifting arrangements can be provided which will cause the motor to be self-starting but, such arrangements necessarily sacrifice electromechanical efficiency, torque versus speed characteristics, and so on.

It is an object of the present invention to provide simple means for overcoming the above mentioned difficulties.

Another object of the invention is to provide suitable means for starting brushless direct current powered motors.

A further object of my invention is to provide starting means for brushless D.C. motors commutated by multivibrators which are adjusted for stability when the rotor is stopped.

A further object is to provide simple, inexpensive, dependable starting means for brushless D.C. motors.

A further object is to provide brushless D.C. motors with starting means which do not draw significant current or reduce electrical or mechanical efficiency when the motor is running.

A further object is to provide starting means for brushless D.C. motors which while completely automatic at the same time requires no rubbing or moving electrical contacts.

In accordance with one aspect of the present invention I meet these and other objects by utilizing coils to sense inductively from the motor energizing coils the time when the rotor of the motor is in motion, together with a solid state switch which energizes a rotary solenoid whenever the power is on but the sensing coils pick up no signal of rotor motion, and which deenergizes the solenoid when rotor motion is sensed, together with a clutch which imparts the motion of the solenoid to the motor rotor for starting purposes but permits the rotor to continue its motion when the solenoid has completed its stroke.

Other objects and advantages will become apparent and the invention may be better understood from consideration of the following description taken in connection with the accompanying drawing, in which.

Figure 1:
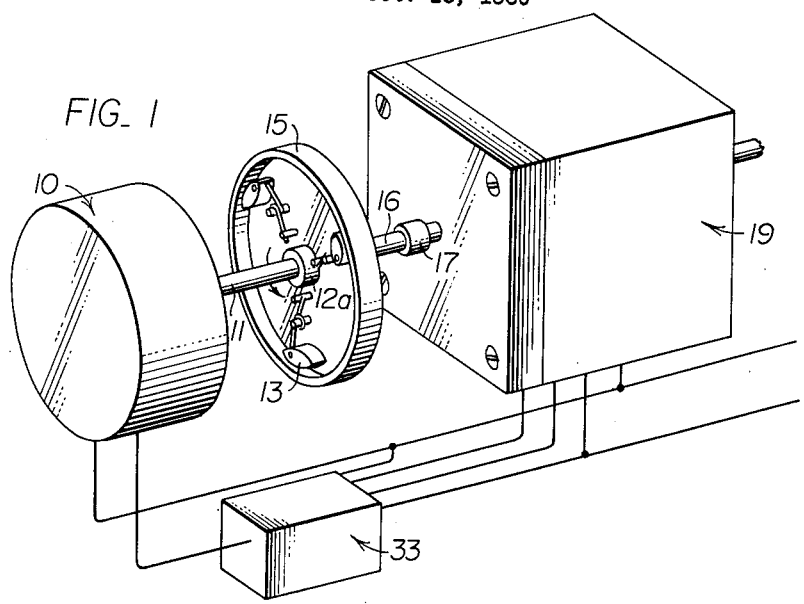
FIG. 1 is a perspective view (with supports omitted, for clarity) showing general mechanical arrangement by exterior views of the principal parts according to a preferred embodiment of the invention.

Referring to FIG. 1, a conventional rotary solenoid 10 may have a usual armature (not shown) and a spring (not shown) to return the armature to open position when the device is de-energized. This solenoid is mechanically coupled by a shaft 11 to the power input disc 12 of a clutch. To this end there may be a firm coupling 12a, into which the solenoid power output shaft 11 may be press fitted or held with set screws, etc. In the illustrated embodiment the clutch input disc 12 carries a plurality of circumferentially spaced pawls 13 rotatably mounted on pins 14 and, when outward, the pawls engage the shell of a cup shaped member 15 which is the power output disc of the clutch. The clutch is actuated by both centrifugal force acting upon the pawls and by the tendency of the mass of the pawls 13 to fall behind their center of rotation when the disc 12 is accelerated in the direction shown by the arrows.

Rotary motion of the clutch output disc 15 is communicated through a shaft 16 and, for example, through a coupling 17 and shaft to the rotor of a brushless D.C. motor shown generally at 19. At the opposite end of the motor the rotor shaft may be used for taking useful rotational power from the motor.

If the rotary solenoid 10 selected is of the type having some axial as well as rotary motion, the axial motion may be taken up in coupling 12a, as by an axially movable key-slot or splined arrangement, or by using a helical coupling spring.

Figure 2A:
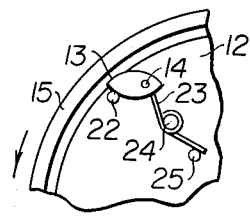
FIG. 2A illustrates a detail of a clutch engaging pawl 13 shown in disengaged position.
Figure 2B:
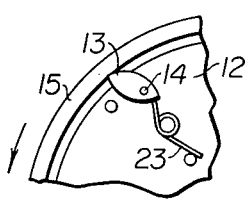
FIG. 2B is a detail of the clutch engaging pawl 13 showing the same in engaged position.

Referring now to FIG. 2A, one of the pawls 13 is shown mounted near the edge of clutch power input disc 12 and close to the inner engagement surface of clutch output disc 15, but in the disengaged position. When the input disc 12 is stationary, the pawl is held back lightly in its rest position against a pin 22 by a spring 23, which is mounted on a pin 24 and held tense by a pin 25. When the clutch power input disc 12 is accelerated in what can be called the forward direction, as a result of energizing the coils or coils of the rotary solenoid 10, each pawl will quickly rotate to the position shown in FIG. 2B because its center of gravity is both ahead of pawl support pin 14 and radially further from the center of rotation of disc 12 than is pin 14. In the latter (FIG. 2B) position each pawl is restrained from further rotation about pin 14 by the engagement surface of the clutch output disc 15. At the same time, in this position of the pawls, the rotary motion of input disc 12 is firmly transmitted to clutch output disc 15 by all of the pawls which are similarly constructed. By this means, during most of the stroke of the rotary solenoid 10, the rotor shaft of the motor 19 is powerfully accelerated through shaft 16 and coupling 17.

When the rotary solenoid has completed its stroke and abruptly ceases to rotate, the rotor shaft carries the poles of the motor rotor (not shown) through the first set of motor stator poles by momentum, which switches one or more multivibrators and powers the motor for continuous rotation as explained in the above mentioned copending application. When the input disc 12 abruptly stops, pawls 13 drop away from the engagement surface of output disc 15, toward pins 22, aided by their momentum and by springs 23. Furthermore the relative continued motion of disc 15 with respect to stopped disc 12 tends to throw the pawls 13 toward pins 22.

Figure 3:
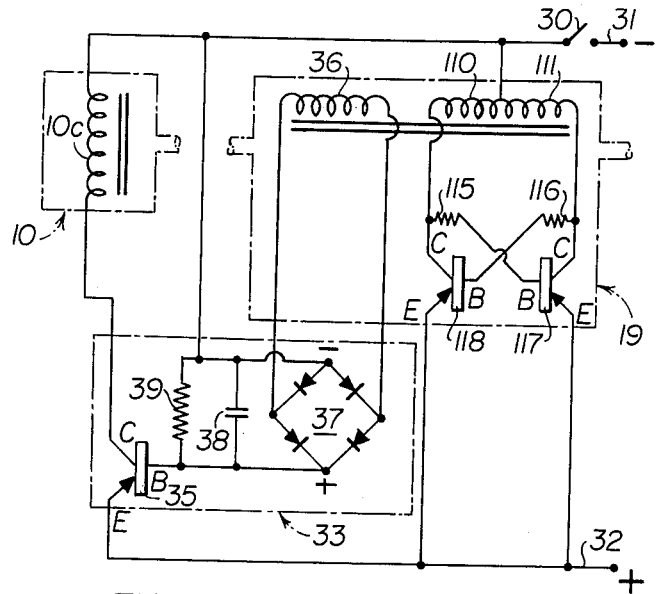
FIG. 3 is a schematic diagram showing electrical connections for a preferred embodiment of the invention.

Referring next to FIG. 3, the electrical circuit may include a main switch 30 in a D.C. supply minus line 31 which powers motor 19 through stator coils 110, 111 which may be arranged on poles of magnetic material cooperating with a permanent magnet rotor (not shown)

as fully described in the copending application above referred to, and as also there described the circuits are completed by connecting the outer ends of coils 110, 111 to the collectors of transistors 118, 117, respectively, with the transistor emitters connected to the plus line (32) and the bases of the transistors connected each through a resistor 116 (or 115) with the collector of its oposite number.

In accordance with the present invention 31 and 32 are carried on to energize an operating coil 10c in the rotary solenoid 10 but only through electrical apparatus as indicated generally at 33 in FIG. 1, and which, as seen in FIG. 3, for example, may include a transistor 35 having its collector attached to one end of 10c and its emitter connected to plus line 32 while its base is biased from an added motor stator coil (or coils) 36 through a full wave rectifier 37 and a capacitor 38 and resistor 39 rectifier-output-network tied at one end to the main negative line 31.

In operation, when the rotor is not moving and power is applied to the motor and stater circuit, transistor 35 conducts heavily through the rotory solenoid energizing coil (or coils) 10c due to the forward bias applied to the transistor base through resistor 39.

The initial pulse of power generated in coils 36 (by induction from one or the other of the motor energizing coils 110—111), at the instant the power circuit switch 27 is first closed, is largely absorbed in slightly charging capacitor 38.

As a result of the conduction by transistor 35, coil 10c is energized and the rotary solenoid 10 actuated. The mechanical steps previously described take place in the sequence given, that is:

(1) Acceleration of clutch input disc in forward direction.

(2) Rotation of pawls to pick up clutch output cup and disc to start the motor.

(3) Drop out of the pawls and disengagement of the clutch when the rotary solenoid reaches the end of its stroke.

Once the rotor begins rotation, the motor energizing coils 110—111 produce strong alternating magnetic flux as explained in the copending application. This flux also passes through the rotation sensing coil means 36 wound upon the same poles or at least upon portions of the same magnetic circuit, and an alternating voltage is induced in the sensing coil or coils 36. This voltage is rectified by the rectifier bridge 37 which charges the capacitor 38 quickly and produces a voltage drop across the bias resistor 39 in the reverse direction and greater than the forward bias provided by the main power supply. When the transistor 35 is reverse biased, the current to coils 10c of solenoid 10 drops nearly to zero and the spring with which the solenoid is assumed equipped returns the armature to rest position, ready for another starting action whenever required.

If at any time the motor slows to a halt through heavy mechanical loading, the solenoid will automatically close and provide torque to restart the motor. Similarly, whenever the motor stops due to opening of the power supply circuit, as by switch 30, the starter will automatically start the motor when the switch is reclosed.

Various kinds of clutches other than the one described are suitable for the service described, including not only clutches operated by inertia forces, but also those engaged by axial motion of a solenoid shaft, electromagnetic clutches, certain kinds of friction clutches involving time delays and/or compressed helical springs, etc. All kinds of clutches which may be suited to this service are within the scope of the invention. Similarly, a variety of kinds of solenoids either rotary or linear (acting, for example, tangentially to a circumference) are within the scope of my invention. Similarly, the solenoid energizing (and deenergizing) circuit may sense the presence of alternations in the motor energizing circuits not through inductive coupling, as shown, but by capacitive coupling or by direct coupling, and instead of a transistor other devices might be used to switch the solenoid on and off, for example, thermionic devices, or electromechanical devices such as relays, and while I have illustrated and described a particular embodiment various modifications may obviously be made without departing from the true spirit and scope of the invention which is intended to be defined only by the appended claims taken with all reasonable equivalents.

I caim:

1. Starter apparatus for an electric motor having rotor and stator portions and coils mounted on the stator portion, said apapratus comprising means for sensing alteration of current in at least one of said stator coils, electromechanical means arranged to initiate rotation of said rotor portion, connection means for energizing said electro mechanical means whereby to initiate rotation of the motor, and an electric circuit means associating the sensing means with said connection means and configured and arranged to de-energize said electromechanical means responsive to said sensing means when rotation of the motor causes alteration of current in at least one of the first mentioned stator coils.

2. Starter apparatus as in claim 1 further characterized by the electromechanical means comprising the combination of a solenoid and a clutch with the clutch mechanically interposed between solenoid and motor rotor portion and arranged to be engaged during operation of the solenoid and disengaged thereafter to permit continued rotation of the motor rotor portion.

3. Starter apparatus as in claim 1 further characterized by the sensing means comprising an energy transmitting coupling with the motor stator coils, the electric circuit means comprising (1) a rectifier fed from said coupling, and (2) a switch in series circuit with the solenoid while triggered from the output of said rectifier.

4. A starter for a motor of the type having a permanent magnet rotor cooperating with a stator core having windings, a source of D.C. power therefor, and means for commutating the D.C. current to provide an alternating flux in the stator core with rotor rotation, said starter comprising a solenoid, a clutch for mechanically coupling motion of said solenoid to the motor rotor, centrifugally operable pawls arranged within said clutch for permitting pick-up of the clutch with initial motion of the solenoid and drop-out of the clutch with continuous motor rotor motion after the solenoid has completed its stroke, a switching means connected to energize said solenoid whenever the power is on and the motor rotor is stationary, and means responsive to current alternations in said stator windings for de-activating the switch to de-energize the solenoid when the power is on and the motor rotor is in substantial rotation.

5. A starter for a motor as in claim 4 further characterized by the last mentioned means comprising sensing coil means arranged on the stator core to be linked by the alternating flux generated by the motor stator coils, a rectifier fed from said sensing coil means to convert the current induced therein to direct current, and a transistor arranged in circuit with the solenoid and with the rectifier for controlling the current flow through said solenoid while biased from the sensing coil rectified output so that when the power is on and the sensing coil means and rectifier are deenergized due to the absence of rotor rotation and alternations in the stator coils, the solenoid coil is energized through said transistor, and at times when the power is on and the sensing coils and rectifier are energized due to alternating flux in the motor stator the solenoid is de-energized by the action of rectified sensed current on the transistor.

References Cited in the file of this patent

UNITED STATES PATENTS 1,947,423      Naul                    Feb. 13, 1934